(No Model.) 3 Sheets—Sheet 1.
H. S. MAXIM.
REGULATOR FOR DYNAMO ELECTRIC MACHINES.
No. 255,311. Patented Mar. 21, 1882.
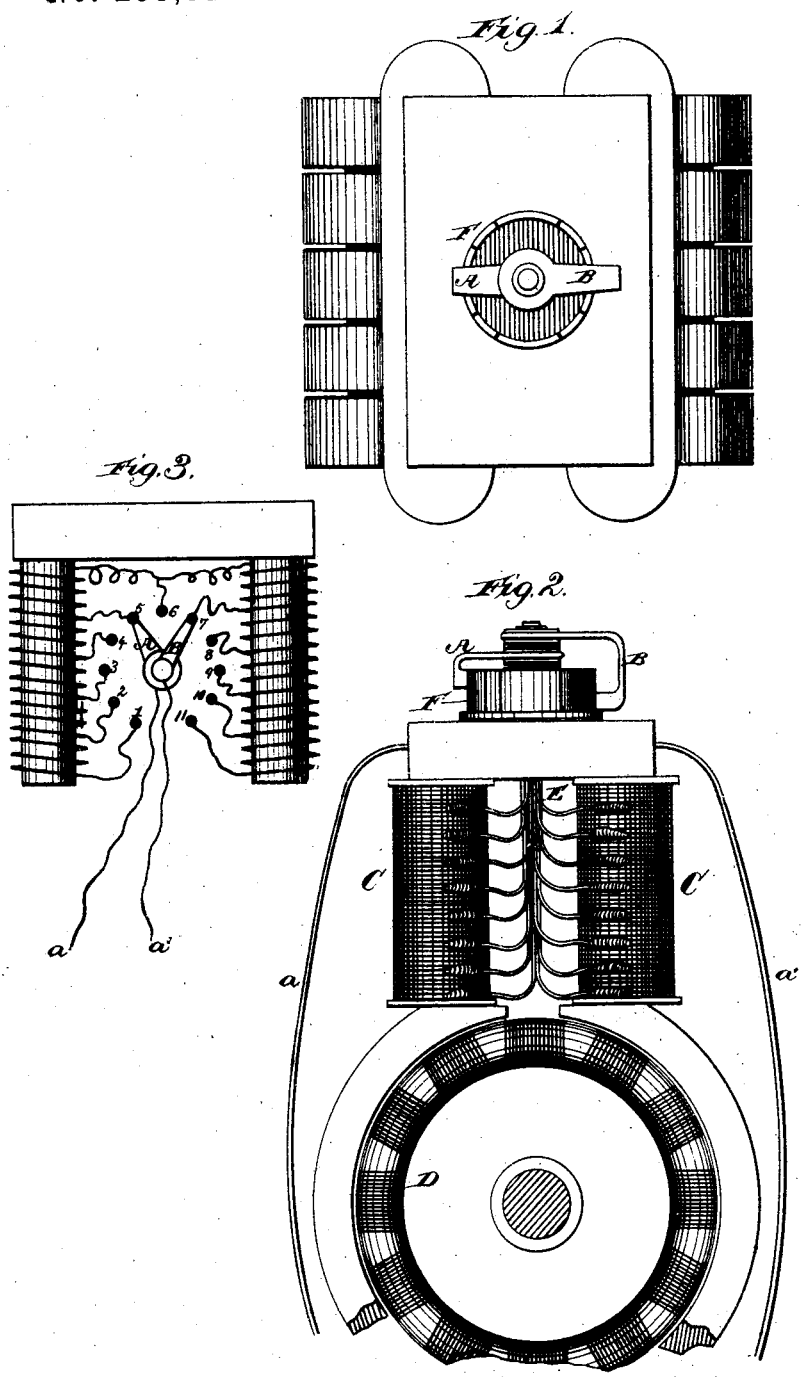
ATTEST,
Clayton H. Wieland
Henry Bain.
INVENTOR,
Hiram S. Maxim
per Parker W. Page Atty

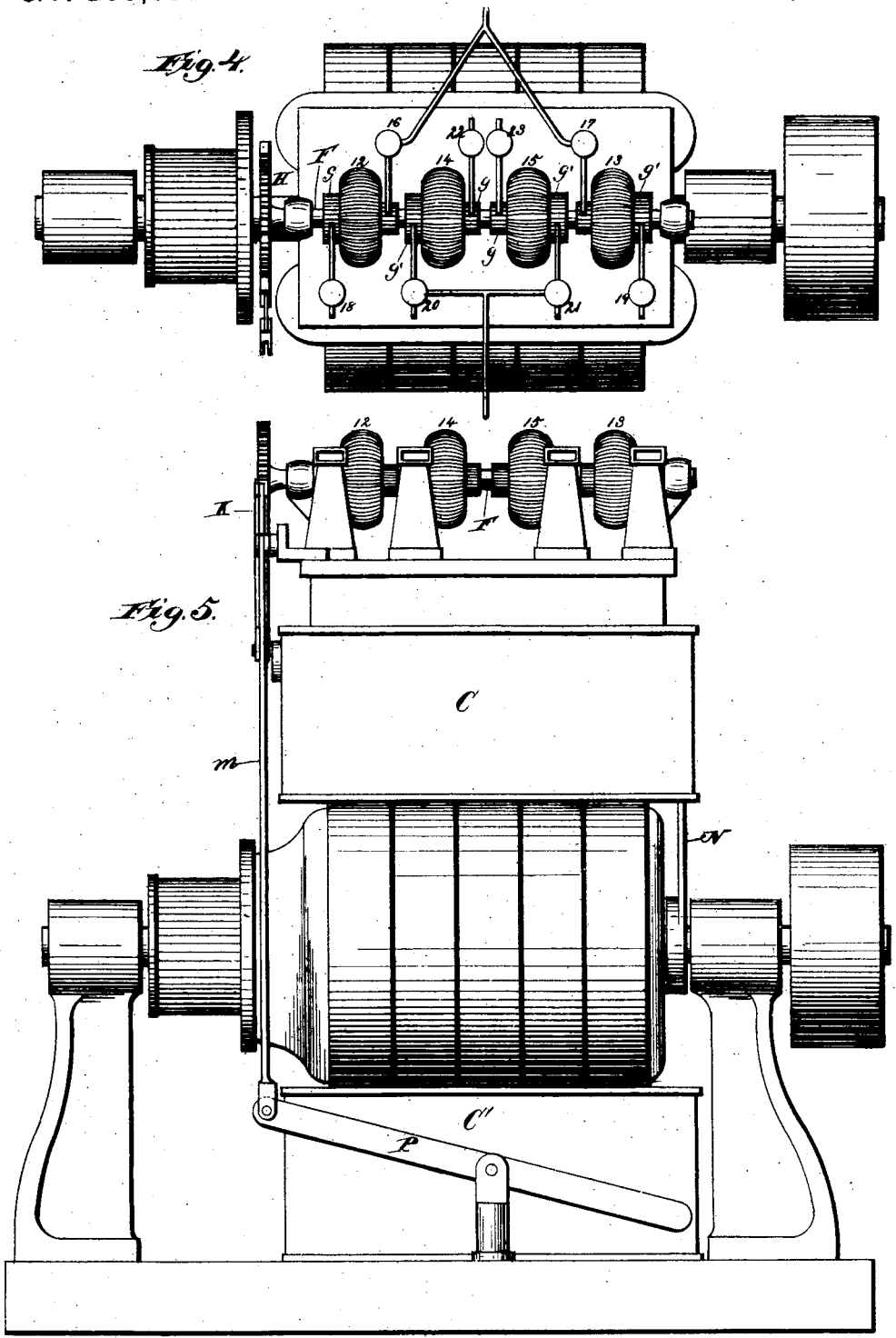

(No Model.) 3 Sheets—Sheet 3.
H. S. MAXIM.
REGULATOR FOR DYNAMO ELECTRIC MACHINES.
No. 255,311. Patented Mar. 21, 1882.
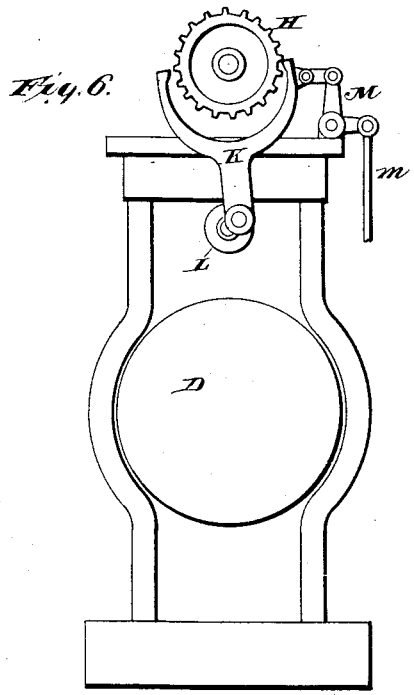
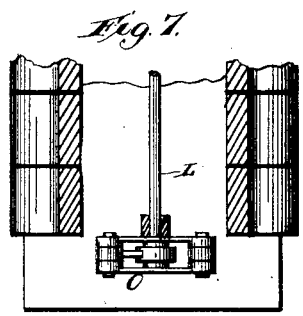
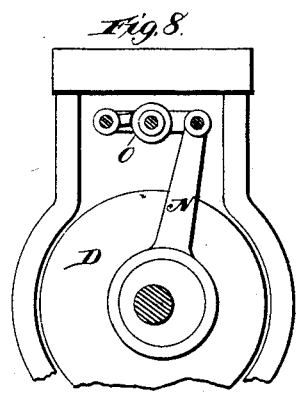
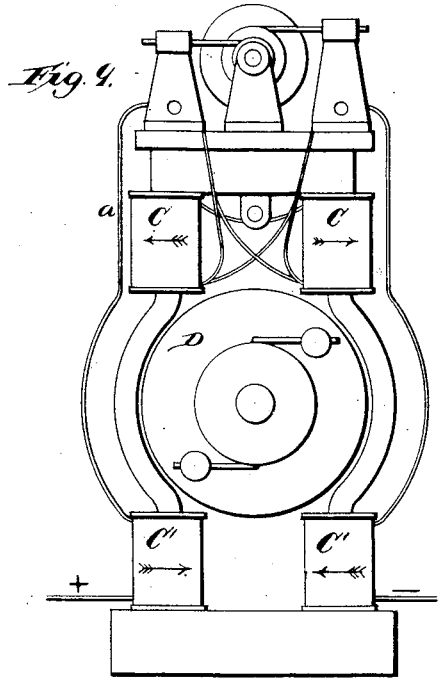
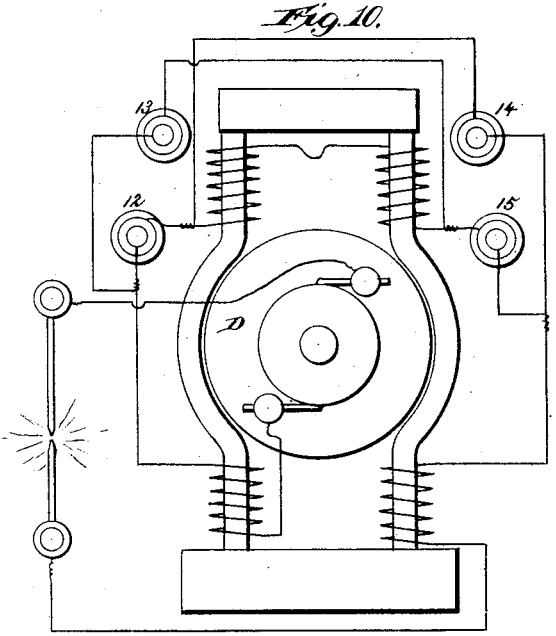
Witnesses.
Robert Everett
Clayton Kneeland
Inventor.
Hiram S. Maxim
By Parker W. Page
Atty

UNITED STATES PATENT OFFICE.

HIRAM S. MAXIM, OF BROOKLYN, ASSIGNOR TO THE UNITED STATES ELECTRIC LIGHTING COMPANY, OF NEW YORK, N. Y.

REGULATOR FOR DYNAMO-ELECTRIC MACHINES.

SPECIFICATION forming part of Letters Patent No. 255,311, dated March 21, 1882.

Application filed August 5, 1881. (No model.)

*To all whom it may concern:*

Be it known that I, HIRAM S. MAXIM, of the city of Brooklyn, county of Kings, and State of New York, have invented certain new and useful Improvements in Dynamo-Electric Machines, of which the following is a specification.

My invention relates to devices employed in connection with dynamo-electric generators for regulating them with respect to the current generated, so that without changing the speed at which such machines are driven they will be caused at all times to produce a constant volume of current, or one which will be just sufficient to meet the requirements of the external circuit, as the case may be.

The object which I have in view is to extend the range of effects produced by this form of regulator with reference particularly to those employed with generators having concentric poles. This object I effect by the employment of devices which cause changes in the position and in the strength of the points of maximum magnetic attraction in the field-of-force magnets, said devices operating to produce the above results by cutting out sections of the field-magnet coils, or by shunting portions of the current around the field, and by changing the direction of the current flowing through portions of the coils of the field-magnets.

In the accompanying drawings, Figure 1 is a top view of a machine having concentric poles and provided with a manual switch for producing the above-described results; and Fig. 2, a side view, in elevation, of the same; Fig. 3, a diagrammatic representation of the circuit-connections; Fig. 4, a top view of a machine provided with an automatic means for effecting the regulation; Fig. 5, an elevation of the same; Fig. 6, a side view of the device for imparting motion to the switch mechanism; Fig. 7, a plan, and Fig. 8 a part sectional view, of means for transmitting motion from the shaft of the generator to the switch mechanism. Figs. 9 and 10 are illustrations designed to elucidate the operation of the device by showing the circuits that are necessary for effecting the cutting out and the reversing of current in the coils of the field-magnets.

In the several figures similar letters refer to corresponding parts.

C C are the upper coils of the field-magnets of a dynamo-electric machine; C' C', the corresponding coils at the opposite ends of the magnets.

D is a revolving armature, the current from which is carried through all the coils of the field-magnets in such direction that the position of the points of magnetic attraction will be midway between the two sets of coils. The upper coils, C, are shown in Fig. 2 to be composed of a number of sections from the ends of which wires E are carried to terminal plates of the switch F, situated on top of the magnets. The connection of the wires E in the switch with reference to the two contact-arms A B is illustrated in Fig. 3. In this figure the stops or contact-points numbered from 1 to 11 represent the sections of the switch or the terminal plates for each section of the coil C. The arms A B are arranged, when turned to pass over the contact-plates of the switch, (they are insulated from one another, one connected with the wire $a$ and the other with the wire $a'$,) so that as the arms are carried over the terminal points they will cut out the sections of the coil C C.

In illustration of the principle of the method proposed by me, suppose the arm B to be brought in contact with terminal 11, the arm A with terminal 1. In this case the current from the wires $a\ a'$ would flow through the entire length of coil C C. If, however, it be desired to reduce the amount of current generated by the machine, the arm A is moved to the next terminal point, 2, thus cutting out one section of the coil. For further reductions of the current the arm A is moved to the next succeeding terminal, and in this way all the coils may be cut out of the circuit. In general it will be found advisable in obtaining reductions of speed to cut out the same number of coils from each side of the magnet, so that when the arms A and B are both brought into contact with terminal 6 no current will be flowing through the coil C. Should the current then generated by the machine be in excess of that required, a still further reduction in the volume may be effected by causing the current to flow in a contrary direction through the coils C C. This is done by interchanging the positions of the two arms A and B, or, in other words, by carrying the arm B to the left and the arm A to the right of terminal 6, in which event the current will be directed in a contrary direction through these sections of the coil C C, over which the arms are carried. In this way the points of maximum attraction are not only shifted in position, but are weakened until the whole current flows through the coils C in a direction to neutralize the effect of the magnetism of the coil C', in which case no magnetic effect will be observable in the portions of the field-magnets near which the armature revolves.

Instead of cutting out sections of a coil of a field-magnet, the same result may be effected by shunting the portions of the current around said field-magnet; and a further part of my invention consists in the means for effecting this, as will be understood by reference from Figs. 4 to 10. The machine in this case is of the same character as that illustrated in the foregoing figures, and consists of field-magnets wound with coils C C', the direction of winding being such as to form under normal conditions concentric poles midway between the upper and lower coils.

On the upper plate connecting the two magnets is fixed a regulator composed of the following parts: a shaft, F, journaled in suitable uprights, and provided at one end with a ratchet-wheel, H, a double pawl, K, to which is imparted a reciprocating movement by a rotating shaft, L, with which it is eccentrically connected, and a bell-crank lever, M, linked to one arm of pawl K, and connected by rod $m$ with an armature of an electro-magnet or a pivoted magnetic bar, P. Shaft L is journaled in bearings placed between the two interior faces of the upper field-magnets, and a rotary motion imparted to it by an eccentric arm, N, from the main shaft of the generator. This arm N oscillates a pivoted lever or frame, O, at one end of which a friction-pawl is pivoted, so as to engage with a small friction-wheel on the end of shaft L. The magnetic bar P is pivoted at one side of the lower field-magnet coil, C', and connected with the rod $m$. The position of bar P varies according to the magnetic strength of the field-magnet, tending to assume a position nearer the vertical as the strength of the magnetism increases and falling as the same decreases. From this it results that when the machine is running the shaft F would be turned from right to left or from left to right, or will remain stationary, according to the position of pawl K and bar P, the position of the latter being determined by the amount of current flowing through coil C' of the lower field-magnet of the machine.

In Figs. 4 and 5 are shown four resistance-coils, numbered from 12 to 15, and secured to shaft F. The construction of these coils is similar in principle to an ordinary rheostat, except that for greater convenience they are wound in ring form, the end of the first section being in contact with a continuous ring, $g$, and the connection between the series of sections composing the coil being formed through insulated metallic segments of rings $g'$. Posts numbered from 16 to 23 are fixed upon the base of the regulator, and carry contact-strips which bear on the rings $g\ g'$ of the several resistance-coils. The posts and strips serve simply to connect the resistance devices with their respective circuits, as shown in Fig. 9.

The operation of the above devices will be understood by reference to Figs. 9 and 10. Let us assume that the machine is generating a certain given amount or volume of current, that in this case practically the whole current is passing through the upper field-magnet coils, as well as through the lower, and that coils 13 and 14 are in a position where they interpose their maximum while coils 12 and 15 are in a position where they interpose their minimum of resistance. If a certain amount of resistance be now taken out of the external circuit, an increase in the volume of current at once causes the regulating magnetic bar to shift its position and move the pawl to one side or the other, so that until the desired equilibrium is established the shaft F is caused to revolve, by this means increasing the resistance through the coils 12 and 15 and decreasing that through coils 13 and 14. A portion of the current is thus diverted from the coils of the upper magnet, and the position of the concentric poles will be correspondingly raised, owing to the predominating influence of the lower coils. Further removals of resistance or work from the external circuit cause a continuance of this same operation up to the time that the resistances of all the coils are equal. At this stage a very small proportion only of the current is flowing through the upper coils of the magnet. A still further reduction in external resistance causes the shaft F to still turn in the same direction, so that the resistance of coils 13 and 14 becomes less than that of 12 and 15. As soon as this takes place the path of least resistance will be from coil 13 to and through coil 14, the path of next higher resistance being from coil 12 to coil 14. Under these conditions the current divides as before between coils 12 and 13, but from coil 13 the current in passing to coil 14 traverses the field in a direction contrary to that in which it was previously flowing. The further shaft F is turned the more current will flow in this direction, until when the coils are in a position where 12 and 15 interpose their maximum and 13 and 14 their minimum amount of resistance practically the whole current will be passing through the upper field-magnet coils in a direction to neutralize the effect of the coils C' on the lower ends of the magnet. The machine will now generate no current, or at least a very slight amount.

It may thus be said that my system provides for all degrees of generative capacity from the highest to the lowest of which the machine is capable. It may be stated that instead of the magnetic bar shown an electro-magnet in a cross-circuit between the positive and negative wires from the machine may be employed to determine the position of shaft F, the current generated under these conditions not being constant in amount, but varied to meet the requirements of the external circuit.

Having thus described my invention, what I claim as new, and desire to secure by Letters Patent, is—

1. The combination, with the field-magnet coils of a dynamo-electric machine, of a combined resistance-switch and current-reverser, substantially as set forth.

2. The method of regulating dynamo-electric machines, substantially as described, which consists in first diverting the current from a portion of the coils around the field-magnets, and then reversing its direction in the same, as described.

3. The combination, with a dynamo-electric machine, of a rotary regulating device adapted to be moved by the main shaft of the machine, a pivoted magnetic bar placed in proximity to the lower portion of the main magnets, mechanism, substantially such as described, connecting the same with the regulating mechanism, for the purpose of controlling the extent and direction of movement of the latter.

4. The combination of rotary shaft F, carrying resistance devices, as described, ratchet-wheel H, oscillating pawl K, connected to a shaft, L, that is continuously revolved by the main shaft of the machine, and lever-connections M from the pawl to a pivoted magnetic bar, P, or its equivalent, substantially as described.

In testimony whereof I have hereunto set my hand this 26th day of July, 1881.

HIRAM S. MAXIM.

Witnesses:
PARKER W. PAGE,
CLAYTON KNEELAND.